United States Patent
Kamiya et al.

(10) Patent No.: US 11,891,501 B2
(45) Date of Patent: Feb. 6, 2024

(54) METHOD OF PRODUCING RESIN MODIFIER, RESIN MODIFIER, AND COMPOSITE MATERIAL

(71) Applicants: TOAGOSEI CO., LTD., Tokyo (JP); THE UNIVERSITY OF TOKYO, Tokyo (JP)

(72) Inventors: Daisuke Kamiya, Tokyo (JP); Akihiro Gotou, Nagoya (JP); Shun Nakano, Nagoya (JP); Shiroshi Matsuki, Nagoya (JP); Shuji Fujisawa, Tokyo (JP); Tsuguyuki Saito, Tokyo (JP); Ryo Saito, Tokyo (JP)

(73) Assignees: TOAGOSEI CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 239 days.

(21) Appl. No.: 17/438,211

(22) PCT Filed: Feb. 26, 2020

(86) PCT No.: PCT/JP2020/007662
§ 371 (c)(1),
(2) Date: Sep. 10, 2021

(87) PCT Pub. No.: WO2020/184177
PCT Pub. Date: Sep. 17, 2020

(65) Prior Publication Data
US 2022/0186015 A1    Jun. 16, 2022

(30) Foreign Application Priority Data

Mar. 12, 2019 (JP) .................. 2019-044803
Nov. 26, 2019 (JP) .................. 2019-213680

(51) Int. Cl.
*C08L 25/06* (2006.01)
*C08J 5/06* (2006.01)
*D21C 3/18* (2006.01)

(52) U.S. Cl.
CPC ........... *C08L 25/06* (2013.01); *C08J 5/06* (2013.01); *D21C 3/18* (2013.01); *C08J 2325/06* (2013.01); *C08J 2401/02* (2013.01); *C08L 2205/16* (2013.01)

(58) Field of Classification Search
CPC ......... C08L 25/06; C08L 2205/16; C08J 5/06; C08J 2325/06; C08J 2401/02; D21C 3/18
USPC ........................................ 524/733
See application file for complete search history.

(56) References Cited

FOREIGN PATENT DOCUMENTS

| JP | 2013-014741 | | 1/2013 |
| JP | 2013-227536 | | 11/2013 |
| JP | 2015-000935 | | 1/2015 |
| JP | 2015-007196 | | 1/2015 |
| JP | 2016155897 A | * | 9/2016 |
| JP | 2017-052888 | | 3/2017 |
| JP | 2017052888 A | * | 3/2017 |
| JP | 2018-044098 | | 3/2018 |
| JP | 2018044098 A | * | 3/2018 |

OTHER PUBLICATIONS

Translation of JP 2016-155897 (patents application 2015-033116), Sep. 1, 2016. (Year: 2016).*
Translation of JP 2017-052888 (patents applicaton 2015-178602), Mar. 16, 2017. (Year: 2017).*
Translation of JP 2018-044098 (patents applicaton 2016-181124), Mar. 22, 2018. (Year: 2018).*
PCT International Search Report (w/ English translation) for corresponding PCT Application No. PCT/JP2020/007662, dated May 19, 2020, 5 pages.

* cited by examiner

*Primary Examiner* — Hui H Chin
(74) *Attorney, Agent, or Firm* — Dority & Manning, P.A.

(57) ABSTRACT

A method of producing a resin modifier, the method comprising a process of polymerizing an ethylene unsaturated monomer in the presence of a cellulose nanofiber, the cellulose nanofiber being reacted with an amine or a quaternary ammonium salt compound.

16 Claims, No Drawings

METHOD OF PRODUCING RESIN MODIFIER, RESIN MODIFIER, AND COMPOSITE MATERIAL

CROSS-REFERENCE TO RELATED APPLICATIONS

The present application is a US national phase entry of International Patent Application No. PCT/JP2020/007662, filed Feb. 26, 2020, which, in turn, is based upon and claims the right of priority to both Japanese Patent Application No. 2019-044803, filed Mar. 12, 2019, and Japanese Patent Application No. 2019-213680, filed Nov. 26, 2019, the disclosures of all of which are hereby incorporated by reference herein in their entirety for all purposes.

TECHNICAL FIELD

The invention relates to a method of producing a resin modifier, a resin modifier and a composite material.

BACKGROUND ART

Resin materials, with which a reinforcing material is compounded in order to improve strength, have been widely used as lightweight and high-strength materials. As the reinforcing material, carbon fiber and glass fiber are typically used. However, these fibers are prone to burning and are regarded as unsuitable for thermal recycling. Further, these fibers have problems in that carbon fiber is expensive and glass fiber is heavy.

In view of these problems, use of a plant fiber as a reinforcing material for a resin has been studied. The plant fiber is prepared by defibrating a plant-based fiber, rather than by artificially synthesizing. Since plant fiber leaves little ash upon burning, there is no need to dispose of the ash in a furnace or landfill. As such, use of a plant fiber, especially a cellulose nanofiber, which is a material obtained by defibrating a plant fiber at the nano-level, as a reinforcing material for a resin has been studied.

There are concerns that a sufficient reinforcing effect may not be achieved when the cellulose nanofiber is simply mixed with a resin, owing to a large number of hydrophilic functional groups that render the cellulose nanofiber less compatible with a resin.

In order to address these concerns, a method in which a cellulose nanofiber is disposed at a surface of resin particles and mixed with a resin, rather than directly mixing the cellulose nanofiber with a resin, has been proposed (see, for example, Patent Document 1).

PRIOR ART DOCUMENT

Patent Document

[Patent Document 1] Japanese Patent Application Laid-Open No. 2013-014741

SUMMARY OF THE INVENTION

Problem to be Solved by the Invention

In the method described in Patent Document 1, resin particles having a surface at which a cellulose nanofiber is present are obtained by preparing an emulsion including a cellulose nanofiber, resin particles and a liquid medium, and then drying the liquid medium. With this method, the cellulose nanofiber may not be bonded to the resin particles strongly enough. As a result, the cellulose nanofiber may fail to uniformly disperse in the resin, and fail to exhibit a sufficient reinforcing effect.

In view of the aforementioned circumstances, the invention aims to provide a method of producing a resin modifier that exhibits an excellent effect of modifying a resin, a resin modifier, and a composite material including the resin modifier.

Means for Solving the Problem

The means for implementing the invention includes the following embodiments.

<1> A method of producing a resin modifier, the method comprising a process of polymerizing an ethylene unsaturated monomer in the presence of a cellulose nanofiber, the cellulose nanofiber being reacted with an amine or a quaternary ammonium salt compound.

<2> The method of producing a resin modifier according to <1>, wherein the resin modifier is in a particulate state.

<3> The method of producing a resin modifier according to <1> or <2>, wherein the process of polymerizing is emulsion polymerization or suspension polymerization.

<4> The method of producing a resin modifier according to any one of <1> to <3>, wherein the process of polymerizing is performed without using an emulsifier.

<5> The method of producing a resin modifier according to any one of <1> to <4>, wherein a proportion of an ethylene unsaturated monomer having a functional group in the ethylene unsaturated monomer is 5 mol % or less.

<6> The method of producing a resin modifier according to any one of <1> to <5>, wherein a product obtained by defibrating an oxidized cellulose is used as the cellulose nanofiber, the oxidized cellulose being obtained from a cellulose-based raw material using, as an oxidant, a hypochlorous acid having an effective chlorine concentration of from 14% by mass to 43% by mass or a salt thereof.

<7> The method of producing a resin modifier according to any one of <1> to <5>, wherein a product obtained by defibrating a polyvalent carboxylic acid-modified cellulose is used as the cellulose nanofiber, the polyvalent carboxylic acid-modified cellulose being obtained by allowing a cellulose-based raw material to react with a polyvalent carboxylic acid.

<8> The method of producing a resin modifier according to <7>, wherein the polyvalent carboxylic acid comprises at least one selected from the group consisting of a dicarboxylic acid, a tricarboxylic acid, a tetracarboxylic acid and a hexacarboxylic acid.

<9> The method of producing a resin modifier according to <7> or <8>, wherein the polyvalent carboxylic acid comprises citric acid.

<10> The method of producing a resin modifier according to any one of <1> to <9>, wherein the oxidized cellulose is obtained without using a compound having a piperidine structure.

<11> A resin modifier, comprising a cellulose nanofiber that is reacted with an amine or a quaternary ammonium salt compound, and a polymer of an ethylene unsaturated monomer.

<12> The resin modifier according to <11>, wherein the cellulose nanofiber is a product obtained by defibrating an oxidized cellulose, the oxidized cellulose being obtained from a cellulose-based raw material using, as an oxidant, a hypochlorous acid having an effective chlorine concentration of from 14% by mass to 43% by mass or a salt thereof.

<13> The resin modifier according to <11>, wherein the cellulose nanofiber is a product obtained by defibrating a polyvalent carboxylic acid-modified cellulose, the polyvalent carboxylic acid-modified cellulose being obtained by allowing a cellulose-based raw material to react with a polyvalent carboxylic acid.

<14> The resin modifier according to any one of <11> to <13>, being in a particulate state.

<15> The resin modifier according to any one of <11> to <14>, wherein a proportion of a structural unit having a functional group among structural units of the polymer of an ethylene unsaturated monomer is 5 mol % or less.

<16> The resin modifier according to any one of <11> to <15>, wherein the polymer of an ethylene unsaturated monomer has a weight-average molecular weight of from 5,000 to 3,000,000.

<17> The resin modifier according to any one of <11> to <16>, wherein an amount of the ethylene unsaturated monomer with respect to 100 parts by mass of the cellulose nanofiber is from 5 parts by mass to 1,000 parts by mass.

<18> A composite material, comprising the resin modifier according to any one of <11> to <17> and a resin.

<19> The composite material according to <18>, wherein the resin includes a component that is identical to a component included in the resin modifier, or the resin includes a segment or a functional group having an affinity with the resin modifier.

Effect of the Invention

According to the invention, a method of producing a resin modifier that exhibits an excellent effect of modifying a resin, a resin modifier, and a composite material including the resin modifier are provided.

EMBODIMENTS FOR IMPLEMENTING THE INVENTION

In the following, embodiments for implementing the invention are explained. However, the invention is not limited to these embodiments. The elements of the embodiments (including steps) are not essential, unless otherwise stated. The numbers and the ranges thereof do not limit the invention as well.

In the present disclosure, the "process" refers not only to a process that is independent from the other steps, but also to a step that cannot be clearly distinguished from the other steps, as long as the aim of the process is achieved.

In the present disclosure, the numerical range represented by "from A to B" includes A and B as a minimum value and a maximum value, respectively.

In the present disclosure, when numerical ranges are described in a stepwise manner, the values of the upper or lower limit of each numerical range may be substituted by the values of the upper or lower limit of the other numerical range, or may be substituted by the values described in the Examples.

In the present disclosure, each component may include more than one kinds of substances.

When there are more than one kind of substances corresponding to a component of a composition, the content of the component refers to a total content of the substances, unless otherwise stated.

In the present disclosure, each component may include more than one kind of particles. When there are more than one kind of particles corresponding to a component of a composition, the particle size of the component refers to a particle size of a mixture of the more than one kind of particles.

In the present disclosure, the "(meth)acrylic" refers to at least one of acrylic or methacrylic, and the "(meth)acrylate" refers to at least one of acrylate or methacrylate.

<Method of Producing Resin Modifier>

The method of producing a resin modifier according to the present invention includes a process of polymerizing an ethylene unsaturated monomer in the presence of a cellulose nanofiber, and the cellulose nanofiber being reacted with an amine or a quaternary ammonium salt compound.

A resin modifier produced by the above method exhibits an excellent effect of modifying a resin. Although the reason for this is not exactly clear, it is thought to be as follows.

A resin modifier produced by the above method is in a state in which a cellulose nanofiber is reacted with an amine or a quaternary ammonium salt compound. Therefore, the cellulose nanofiber is highly compatible with a resin to be modified, and an excellent effect of modification is exhibited.

Further, in the above method, the resin modifier is produced by polymerizing an ethylene unsaturated monomer in the presence of a cellulose nanofiber. Therefore, it is thought that at least a part of the cellulose nanofiber is complexed with a polymer of the ethylene unsaturated monomer (for example, at least a part of the cellulose nanofiber is included in a particle of the polymer). As a result, the cellulose nanofiber is dispersed in the resin to be modified in a favorable manner, and an excellent effect of modification is exhibited.

In the method according to the present invention, the timing for causing the reaction of the cellulose nanofiber with an amine or a quaternary ammonium salt compound is not particularly limited. For example, it is possible to polymerize the ethylene unsaturated monomer in the presence of the cellulose nanofiber that has been preliminarily reacted with an amine or a quaternary ammonium salt compound; or to allow the cellulose nanofiber to react with an amine or a quaternary ammonium salt compound after the polymerization of the ethylene unsaturated monomer; or to allow the cellulose nanofiber to react with an amine or a quaternary ammonium salt compound during the polymerization of the ethylene unsaturated monomer.

In a case of using a cellulose nanofiber that has been preliminarily reacted with an amine or a quaternary ammonium salt compound, it may be advantageous in that the ethylene unsaturated monomer is easily emulsified or dispersed in the presence of the cellulose nanofiber, and is polymerized in a stable manner. In a case of allowing the cellulose nanofiber to react with an amine or a quaternary ammonium salt compound after the polymerization of the ethylene unsaturated monomer, it may be advantageous in that it is easy to remove the excessive amine or a quaternary ammonium salt compound.

From the viewpoint of dispersibility with respect to a resin, the resin modifier produced by the method according to the present invention is preferably in a particulate state.

When the resin modifier is in the form of particles, the particle size thereof is not particularly limited. For example, the particle size of the resin modifier may be in a range of from 0.01 μm to 100 μm. In an embodiment, the particle size of the resin modifier may be less than 0.1 μm. The particle size of the resin modifier is measured by a method described in the Examples.

(Cellulose Nanofiber)

The cellulose nanofiber used in the method according to the present invention is not particularly limited, as long as it is obtained from a cellulose-based raw material. The cellulose-based raw material is not particularly limited, as long as it is mainly composed of cellulose, and examples thereof include pulp, natural cellulose, regenerated cellulose, and fine cellulose that is obtained by depolymerizing a cellulose-based raw material by a mechanical treatment. It is possible to use a commercial product, such as a crystalline cellulose obtained from pulp, as the cellulose-based raw material. The cellulose-based raw material may be subjected to a chemical treatment, such as an alkali treatment, in order to facilitate the penetration of an oxidant that is used in a method to be described later.

The fiber length of the cellulose nanofiber is not particularly limited, preferably from 10 nm to 5,000 nm, more preferably from 50 nm to 2,000 nm, further preferably from 100 nm to 700 nm.

When the fiber length of the cellulose nanofiber is 5,000 nm or less, the viscosity of a mixture of the cellulose nanofiber and a resin is not too high, and a uniform mixture tends to be obtained.

When the fiber length of the cellulose nanofiber is 10 nm or more, a sufficient effect of reinforcing the composite material tends to be achieved.

The fiber diameter of the cellulose nanofiber is not particularly limited, preferably from 1 nm to 100 nm, more preferably from 3 nm to 10 nm.

The method of obtaining the cellulose nanofiber from a cellulose-based raw material is not particularly limited. For example, a method of subjecting a cellulose-based raw material to an oxidation treatment with sodium hypochlorite as an oxidant, in the presence of a compound having a piperidine structure such as 2,2,6,6-tetramethyl-1-piperidine-N-oxyl radical (TEMPO), is known.

From the viewpoint of reducing an effect on the environment or the human body, the cellulose nanofiber is preferably produced without using a compound having a piperidine structure.

As a method of producing a cellulose nanofiber without using a compound having a piperidine structure, (1) a method of producing a cellulose nanofiber in which an oxidized cellulose is obtained by oxidizing a cellulose-based raw material using hypochlorous acid or a salt thereof having an effective chlorine concentration of from 14% by mass to 43% by mass, and the oxidized cellulose is defibrated; and (2) a method in which a polyvalent carboxylic acid-modified cellulose is obtained by allowing a cellulose-based raw material to react with a polyvalent carboxylic acid, and the polyvalent carboxylic acid-modified cellulose is defibrated.

In the method (1), the effective chlorine concentration of hypochlorous acid or a salt thereof is from 14% by mass to 43% by mass, preferably from 16% by mass to 43% by mass, more preferably from 18% by mass to 43% by mass.

Hypochlorous acid or a salt thereof with an effective chlorine concentration of from 14% by mass to 43% by mass is less prone to self-decomposition, and is easy to handle.

The effective chlorine concentration of hypochlorous acid or a salt thereof is a well-known concept, and is defined as follows.

Hypochlorous acid is a weak acid that exists as an aqueous solution. Although a salt of hypochlorous acid can exist as a solid including crystal water, it is generally handled as an aqueous solution because it is a highly instable deliquescent substance. For example, sodium hypochlorite, which is a salt of hypochlorous acid, exists only in a solution. Therefore, the effective chlorine concentration of the solution, rather than that of sodium hypochlorite itself, is regarded as the effective chlorine concentration of sodium hypochlorite.

Since the oxidation power of a divalent oxygen atom, generated by decomposition of sodium hypochlorite, corresponds to two equivalent amounts of monovalent chlorine atom, the bonded chlorine atom of sodium hypochlorite (NaClO) has an oxidation power that is equivalent to two non-bonded chlorine atoms ($Cl_2$). Therefore, the effective chlorine is equal to 2×(chlorine in NaClO).

The effective chlorine concentration is measured by the following method.

A measured sample is added with water, potassium iodide and acetic acid, and is allowed to stand. Then, liberated iodine is titrated with a sodium thiosulfate solution, using an aqueous solution of starch as an indicator.

In the present invention, examples of the hypochlorous acid or a salt thereof include hypochlorite water, sodium hypochlorite, potassium hypochlorite, calcium hypochlorite and ammonium hypochlorite. From the viewpoint of handleability, sodium hypochlorite is preferred.

In the following, a method of producing a cellulose nanofiber using sodium hypochlorite as the hypochlorous acid or a salt thereof, as an oxidant, will be explained.

Examples of the method of adjusting the effective chlorine concentration of an aqueous solution of sodium hypochlorite to be from 14% by mass to 43% by mass include a method of condensing an aqueous solution of sodium hypochlorite having an effective chlorine concentration of lower than 14% by mass; and a method of using a sodium hypochlorite pentahydrate crystal, having an effective chlorine concentration of approximately 43% by mass, directly or with water for dilution. Among these methods, a method of adjusting the effective chlorine concentration of a sodium hypochlorite pentahydrate crystal to a suitable degree as an oxidant is preferred, because the amount of self-decomposition (i.e., the reduction in the effective chlorine concentration) is suppressed.

The amount of the aqueous solution of sodium hypochlorite may be selected from a range in which the oxidation reaction is accelerated.

The method of mixing the cellulose-based raw material with the aqueous solution of sodium hypochlorite is not particularly limited. From the viewpoint of ease of operation, the mixing is preferably performed by adding the cellulose-based raw material to the aqueous solution of sodium hypochlorite.

The reaction temperature for the oxidation reaction is preferably from 15° C. to 40° C., more preferably from 20° C. to 35° C.

In order to facilitate the oxidation reaction, the pH of the reaction system is preferably maintained at from 7 to 14, more preferably from 10 to 14. It is possible to add an alkali such as sodium hydrate or an acid such as hydrochloric acid to the reaction system, in order to adjust the pH thereof.

The time for the oxidation reaction may be adjusted depending on a degree of oxidation to proceed. For example, the time for the oxidation reaction is preferably from 15 minutes to 6 hours.

In the oxidation reaction, a primary hydroxy group in the cellulose-based raw material is changed to a carboxy group, thereby generating oxidized cellulose. The amount of carboxy group in the oxidized cellulose is not particularly limited. The amount of carboxy group per gram of oxidized cellulose is preferably from 0.1 mmol/g to 3.0 mmol/g, more preferably from 0.2 mmol/g to 1.0 mmol/g, during a subsequent process of producing a cellulose nanofiber by defibrating the oxidized cellulose. The oxidation reaction may be performed in two steps.

The amount of carboxy group in the oxidized cellulose may be measured by the following method.

Pure water is added to a slurry containing 0.5% by mass of oxidized cellulose to adjust the volume to be 60 ml, and the pH is adjusted to 2.5 by adding 0.1 M hydrochloric acid. Thereafter, the electrical conductivity is measured while dropping 0.05 N sodium hydrate aqueous solution until the pH is 11. The amount of carboxy group is calculated by assigning the amount of consumed sodium hydrate (a), at a neutralizing stage of weak acid with a moderate change in the electrical conductivity, to the following formula.

Amount of carboxy group (mmol/g oxidized cellulose)=a (ml)×0.05/mass of oxidized cellulose (g)

Subsequently, a cellulose nanofiber is produced by defibrating the oxidized cellulose to the nanometer scale.

The method of defibrating the oxidized cellulose is not particularly limited. For example, the defibration may be performed by stirring the oxidized cellulose in a solvent with a stirrer or the like. From the viewpoint of shortening the time, the defibration may be performed by a mechanical process.

The means for the mechanical process is not particularly limited, and may be performed with a known device such as a screw-type mixer, a paddle-type mixer, a disper-type mixer, a turbine-type mixer, a homomixer under fast rotation, a high-pressure homogenizer, a double cylinder-type homogenizer, an ultrasonic homogenizer, an aqueous counter collision-type disperser, a beater, a disk-type refiner, a conical-type refiner, a double disk-type refiner, a grinder, and a uniaxial or multi-axial kneader. Two or more devices may be used in combination.

The defibration of the oxidized cellulose is preferably performed in a solvent. The solvent used for the defibration is not particularly limited, and may be water or an organic solvent. Examples of the organic solvent include alcohol solvent, ether solvent, ketone solvent, N,N-dimethylformamide, N,N-dimethylacetamide, dimethyl sulfoxide, and acetonitrile.

From the viewpoints of ease of defibration, environmental concerns and handleability, water is preferably used as the solvent.

When an organic solvent is used, acetonitrile is preferred in view of ease of removal and ease of defibration. The solvent may be used singly or in combination of two or more kinds.

In the method (2), any kind of the polyvalent carboxylic acid may be used, as long as it can cause dehydration condensation with a hydroxy group of cellulose that constitutes the cellulose-based raw material under a temperature of from 100° C. to 200° C., and is less prone to thermal decomposition or dehydration condensation under a temperature of from 100° C. to 200° C.

Examples of the polyvalent carboxylic acid include a compound having two or more carboxy groups, such as dicarboxylic acid, tricarboxylic acid, tetracarboxylic acid and hexacarboxylic acid. The compound may be used singly or in combination of two or more kinds. The type of the polyvalent carboxylic acid may be selected depending on the purpose of the cellulose nanofiber to be produced or the like.

Specific examples of the dicarboxylic acid include oxalic acid, malic acid, adipic acid, azelaic acid, sebacic acid, maleic acid, malonic acid, succinic acid, phthalic acid, tartaric acid, itaconic acid and citraconic acid.

Specific examples of the tricarboxylic acid include citric acid, aconitic acid, trimellitic acid and nitrilotriacetic acid.

Specific examples of the tetracarboxylic acid include ethylene tetracarboxylic acid, 1,2,3,4-butane tetracarboxylic acid, naphthalene tetracarboxylic acid and benzene-1,2,4,5-tetracarboxylic acid.

Specific examples of the hexacarboxylic acid include mellitic acid and 1,2,3,4,5,6-cyclohexane carboxylic acid.

The polyvalent carboxylic acid may be an aliphatic carboxylic acid or an aromatic carboxylic acid. From the viewpoint of reactivity and compatibility of the polyvalent carboxylic acid-modified cellulose with respect to a resin, an aliphatic carboxylic acid. The polyvalent carboxylic acid is more preferably citric acid, because citric acid has an excellent reactivity and an ability of introducing a large amount of carboxyl groups to the cellulose.

The method of reacting the polyvalent carboxylic acid with the cellulose-based raw material is not particularly limited. For example, the polyvalent carboxylic acid may be in a state of an anhydride or a hydrate when it is added to the cellulose-based raw material, or may be in a state of an aqueous solution when it is added to the cellulose-based raw material. The reaction is preferably conducted under a temperature of from 100° C. to 200° C.

When the polyvalent carboxylic acid is reacted with the cellulose-based raw material, a catalyst such as scroll and sodium phosphinate may be used.

The amount of the polyvalent carboxylic acid to be reacted with the cellulose-based raw material is preferably from 1 to 50 times as much as the mass of the cellulose-based raw material, more preferably from 1 to 10 times as much as the mass of the cellulose-based raw material.

Although the cellulose-based raw material includes lignin, the amount of lignin in the polyvalent carboxylic acid-modified cellulose is preferably as small as possible. When the amount of the polyvalent carboxylic acid is greater than the amount of the cellulose-based raw materials, it is easier to cause solubilization of lignin, and removal thereof can be performed efficiently. As such, the amount of lignin in the cellulose is reduced, and the defibration of the cellulose can be performed efficiently.

By defibrating the polyvalent carboxylic acid-modified cellulose, which is obtained by reacting the polyvalent carboxylic acid with the cellulose-based raw materials, a cellulose nanofiber is obtained.

The method of the defibration of the polyvalent carboxylic acid-modified cellulose is not particularly limited. For example, the defibration may be performed by the method of the defibration of the oxidized cellulose as described above.

In the method of the present invention, a cellulose nanofiber that is reacted with an amine or a quaternary ammonium salt compound is used. Since an amine or a quaternary ammonium salt compound is reacted with a carboxy group at a surface of the cellulose nanofiber, hydrophobic properties of the cellulose nanofiber and an affinity of the cellulose nanofiber with an ethylene unsaturated monomer and a resin are improved.

In addition, the cellulose nanofiber that is reacted with an amine or a quaternary ammonium salt compound functions as a dispersant in a process of polymerizing an ethylene unsaturated monomer. Therefore, it is possible to omit the use of an emulsifier in a process of polymerizing an ethylene unsaturated monomer. Omission of an emulsifier suppresses the foaming during drying the obtained resin modifier, and is advantageous in terms of processability.

The amine to be reacted with a cellulose nanofiber is not particularly limited, and may be any one of primary amine, secondary amine and tertiary amine.

The carbon number of a hydrocarbon group or an aromatic group that is bonded to a nitrogen atom of the amine or the quaternary ammonium salt compound (when two or more hydrocarbon groups or aromatic groups are bonded to the nitrogen atom, the total carbon number) is not particularly limited, and may be selected from 1 to 100.

It is possible to use an amine having a polyalkylene oxide structure, such as an ethylene oxide/propylene oxide (EO/PO) copolymer portion.

From the viewpoint of imparting a sufficient degree of hydrophobicity to the cellulose nanofiber, the carbon number is preferably 3 or more, more preferably 5 or more.

The quaternary ammonium salt compound to be reacted with the cellulose nanofiber is not particularly limited. Specific examples of the quaternary ammonium salt compound include a quaternary ammonium hydroxide such as tetrabutyl ammonium hydroxide, a quaternary ammonium chloride such as tetrabutyl ammonium chloride, a quaternary ammonium bromide such as tetrabutyl ammonium bromide, and a quaternary ammonium iodide such as tetrabutyl ammonium iodide.

(Ethylene Unsaturated Monomer)

The ethylene unsaturated monomer used in the method of the present invention is not particularly limited, and may be selected depending on the type of the resin to be modified, or the like. The ethylene unsaturated monomer may be used singly or in combination of two or more kinds.

Specific examples of the ethylene unsaturated monomer include (meth)acrylic acid, alkyl (meth)acrylate, alkyleneglycol (meth)acrylate, (meth)acrylonitrile, vinyl halide, maleimide, phenyl maleimide, (meth)acrylamide, styrene, α-methyl styrene and vinyl acetate. Among them, at least one selected from the group consisting of alkyl (meth)acrylate and styrene is preferred.

The alkyl (meth)acrylate may have an alkyl portion with a carbon number of 1 to 10. The alkyl portion may be linear, branched or cyclic. The alkyl portion may have a substituent or may not have a substituent.

The ethylene unsaturated monomer may have a functional group such as a carboxy group, a hydroxy group, an epoxy group, an amino group, an amide group or a cyano group. By having a functional group, it is possible to increase an affinity with the cellulose nanofiber. From the viewpoint of avoiding the difficulty in emulsification or dispersion, or avoiding instable polymerization, the proportion of ethylene unsaturated monomer having a functional group in the total ethylene unsaturated monomer is preferably 5 mol % or less, more preferably 3 mol % or less, further preferably 1 mol % or less.

The weight average molecular weight of a polymer of the ethylene unsaturated monomer is not particularly limited, and may be from 5,000 to 3,000,000, for example. When the weight average molecular weight of the polymer is 5,000 or more, reduction in strength of the resin tends to be suppressed. When the weight average molecular weight of the polymer is 3,000,000 or less, the polymer tends to melt easily in the resin, and exhibits a sufficient effect of modification.

The weight average molecular weight of a polymer of the ethylene unsaturated monomer is measured by a method described in the Examples.

From the viewpoint of an affinity with a resin to be modified, the proportion of a structural unit having a functional unit in the total structural unit that constitutes a polymer of the ethylene unsaturated monomer is preferably 5 mol % or less, more preferably 3 mol % or less, further preferably 1 mol % or less.

The method of polymerizing an ethylene unsaturated monomer in the presence of a cellulose nanofiber is not particularly limited. From the viewpoint of obtaining a resin modifier in a particulate state, the method is preferably emulsification polymerization, suspension polymerization or Pickering emulsion polymerization.

Examples of the method of polymerizing an ethylene unsaturated monomer in the presence of a cellulose nanofiber by emulsification polymerization or suspension polymerization include a method in which a cellulose nanofiber and an ethylene unsaturated monomer are dispersed in a solvent such as water, added with a polymerization initiator, and heated.

The polymerization initiator used for the polymerization of an ethylene unsaturated monomer may be a known polymerization initiator, such as a persulfate, an organic peroxide or an azo compound. Among them, a persulfate is preferred in terms of a reaction rate of polymerization and productivity, and ammonium persulfate is more preferred in terms of hydrophobicity of the obtained resin.

Specific examples of the persulfate include ammonium persulfate, potassium persulfate, and sodium persulfate.

Specific organic peroxide include t-butyl hydroperoxide, cumene hydroperoxide, dicumyl peroxide, benzoyl peroxide, lauroyl peroxide, caproyl peroxide, di-i-propyl peroxydicarbonate, di-2-ethylhexyl peroxydicarbonate, t-butyl peroxypivalate, 2,2-bis(4,4-di-t-butyl peroxycyclohexyl)propane, 2,2-bis(4,4-di-t-amyl peroxycyclohexyl)propane, 2,2-bis(4,4-di-t-octyl peroxycyclohexyl)propane, 2,2-bis(4,4-di-α-cumyl peroxycyclohexyl)propane, 2,2-bis(4,4-di-t-butyl peroxycyclohexyl)butane, and 2,2-bis(4,4-di-t-octyl peroxycyclohexyl)butane.

Specific examples of the azo compound include 2,2'-azobis-2,4-dimethyl valeronitrile, 2,2'-azobis-i-butyronirile, and 2,2'-azobis-4-methoxy-2,4-dimethyl valeronitrile.

The persulfates and the peroxides as mentioned above may be combined with a reducing agent, such as sodium acid sulfite or sodium ascorbate, and used as a redox-type polymerization initiator.

The temperature for the polymerization reaction is not particularly limited. For example, the temperature is preferably from 30° C. to 180° C., more preferably from 50° C. to 150° C.

The proportion of the cellulose nanofiber and the ethylene unsaturated monomer when performing polymerization of the ethylene unsaturated monomer in the presence of the cellulose nanofiber is not particularly limited. For example, the amount of the ethylene unsaturated monomer with respect to 100 parts by mass of the cellulose nanofiber may be from 5 parts by mass to 1,000 parts by mass, or from 10 parts by mass to 100 parts by mass.

The solvent used for the polymerization reaction of the ethylene unsaturated monomer may be removed or may not be removed. It is possible to disperse the obtained resin modifier in a different solvent after removing the solvent used for the polymerization reaction.

The resin modifier obtained by the above method may be used as is, or may be formed into a desired shape, such as particles, beads and pellets.

<Resin Modifier>

The resin modifier according to the present invention includes a cellulose nanofiber that is reacted with an amine or a quaternary ammonium salt compound, and a polymer of an ethylene unsaturated monomer.

The resin modifier exhibits an excellent effect of modifying a resin. Although the reason for this is not exactly clear, it is thought to be as follows.

The resin modifier includes a cellulose nanofiber that is reacted with an amine or a quaternary ammonium salt compound. Therefore, the cellulose nanofiber is highly compatible with a resin, thereby exhibiting an excellent effect of modification.

Further, the resin modifier includes a polymer of an ethylene unsaturated monomer. Therefore, it is thought that at least a part of the cellulose nanofiber is complexed with the polymer of an ethylene unsaturated monomer (for example, at least a part of the cellulose nanofiber is included in a particle of the polymer). As a result, the cellulose nanofiber is dispersed in the resin to be modified in a favorable manner, and an excellent effect of modification is exhibited.

From the viewpoint of dispersibility with respect to a resin, the resin modifier is preferably in a particulate state. When the resin modifier is in the form of particles, the particle size thereof is not particularly limited. For example, the particle size may be from 0.01 μm to 100 μm. In an embodiment, the particle size of the resin modifier may be less than 0.1 μm.

The details and preferred embodiments of the resin modifier and the components thereof may be the same as the details and preferred embodiments of the resin modifier produced by the aforementioned method and the corresponding components.

From the viewpoint of reducing an effect on the environment and the human body, the content of a compound having a piperidine structure such as TEMPO in the resin modifier is preferably as small as possible. For example, the content of a compound having a piperidine structure in the resin modifier is preferably 0.01 ppm or less. More preferably, a compound having a piperidine structure is substantially not included in the resin modifier.

The ethylene unsaturated monomer used as a raw material for the polymer of an ethylene unsaturated monomer is not particularly limited, and may be selected from the monomers as described above. The polymer of an ethylene unsaturated monomer may be a homopolymer formed of a single kind of monomer or a copolymer formed of two or more kinds of monomer.

The weight average molecular weight of the polymer of an ethylene unsaturated monomer is not particularly limited. For example, the weight average molecular weight of the polymer of an ethylene unsaturated monomer may be from 5,000 to 3,000,000, or from 10,000 to 1,500,000.

When the weight average molecular weight of the polymer of an ethylene unsaturated monomer is 5,000 or more, reduction in strength of a resin due to the addition of the resin modifier tends to be suppressed. When the weight average molecular weight of the polymer of an ethylene unsaturated monomer is 3,000,000 or less, the resin modifier tends to melt easily in a resin, thereby achieving a sufficient effect of modification.

The proportion of the cellulose nanofiber and the polymer of an ethylene unsaturated monomer in the resin modifier is not particularly limited. For example, the amount of the polymer of an ethylene unsaturated monomer with respect to 100 parts by mass of the cellulose nanofiber may be from 5 parts by mass to 150 parts by mass, or from 10 parts by mas to 100 parts by mass.

The method of modifying a resin with the resin modifier is not particularly limited. For example, the resin modifier may be added to a resin in an amount of from 0.1 parts by mass to 10 parts by mas with respect to 100 parts by mass of the resin.

<Composite Material>

The composite material according to the present invention is a composite material that includes the resin modifier as mentioned above and a resin.

The type of the resin included in the resin modifier is not particularly limited, and may be a formable resin such as a thermoplastic resin and a thermoplastic elastomer.

Examples of the thermoplastic resin include ABS (acrylonirile-butadiene-styrene) resin, acrylic resin, polyolefin, polyester, polyurethane, polystyrene, polyamide, polyvinyl chloride, and polycarbonate.

Example of the thermoplastic elastomer include an olefin-based elastomer, a styrene-based elastomer, a polyamide-based elastomer, a polyester-based elastomer, and a polyurethane-based elastomer.

The resin included in the composite material preferably includes a component that is identical with a component included in the resin modifier, or includes a segment or a functional group having an affinity with the resin modifier. It is particularly preferable that the resin includes a component that is identical with a component included in the resin modifier or a segment having an affinity with the resin modifier, and the component or the segment forms a polymer alloy structure, from the viewpoint of imparting an effect such as impact absorption. When the resin modifier is not compatible with a resin to be mixed with, dispersibility with respect to the composite material may not be sufficient, whereby deterioration in appearance, braking stress or breaking elongation of the composite material may be caused.

The amount of the resin modifier included in the composite material is not particularly limited. For example, the amount of the resin modifier may be from 0.1 parts by mass to 10 parts by mass with respect to 100 parts by mass of the resin.

EXAMPLES

In the following, the present invention will be explained by referring to the Examples. However, the present invention is not limited to the Examples.

<Preparation of Cellulose Nanofiber A>

A solution having an effective chlorine concentration of 14% by mass was prepared by mixing a sodium hypochlorite pentahydrate crystal having an effective chlorine concentration of 43% (500 g) and pure water (1035.7 g).

The solution was heated at 30° C. and 35 g of pulp (CEOLUS FD-101, Asahi Kasei Corporation, average particle size: 50 μm, carboxy group amount: 0.03 mml/g) were added while stirring with a stirrer. After further stirring for 30 minutes at 30° C., 100 g of pure water were added to the solution.

The solution was subjected to suction filtration with a 0.1-μm PTFE membrane filter, thereby obtaining an oxidized cellulose. The oxidized cellulose was subjected to defibration for 10 minutes with an ultrasonic homogenizer, thereby obtaining a dispersion including 1.3% by mass of cellulose nanofiber A.

<Preparation of Cellulose Nanofiber B>

A dispersion including cellulose nanofiber B was prepared by the same manner as cellulose nanofiber A, except that the effective chlorine concentration of the solution was 30% by mass.

<Preparation of Cellulose Nanofiber C>

A dispersion including cellulose nanofiber C was prepared by the same manner as cellulose nanofiber A, except that the effective chlorine concentration of the solution was 43% by mass.

<Preparation of Cellulose Nanofiber D>

Cellulose nanofiber D was prepared by the same manner as cellulose nanofiber A, except that the effective chlorine concentration of the solution was 12% by mass, and that the defibration was not performed because the product after the filtration contained carboxy group by 0.07 mmol/g, indicating that the oxidation of cellulose failed to proceed.

<Preparation of Cellulose Nanofiber E>

35 g of pulp (CEOLUS FD-101) were added to 2800 g of pure water, and stirred. Subsequently, 0.44 g of TEMPO, 4.4 g of sodium bromide and 10 g of sodium hypochlorite (effective chlorine concentration: 12% by mass) were added thereto. Oxidation reaction was performed while maintaining the pH at 10.5 with 0.5 M sodium hydrate. The reaction was completed when the pH reduction due to oxidation reaction substantially stopped.

The obtained oxidized cellulose was washed with pure water, and further added with pure water such that the content of the oxidized cellulose was 1% by mass. The oxidized cellulose was subjected to defibration with an ultrasonic homogenizer, thereby obtaining a dispersion including 1.3% by mass of cellulose nanofiber E.

<Preparation of Cellulose Nanofiber F>

An aqueous solution of citric acid was prepared by dissolving citric acid anhydride (10 g) in pure water (20 g). The solution was added with softwood kraft pulp (1 g) while stirring with a stirrer, and was kept stirred for 1 hour at 25° C.

The solution was heated in air at 105° C. for 8 hours in an oven to remove water. The dried product was pulverized with a mortar, and classified with a 500-μm sieve.

The product after the classification was heated in air at 130° C. for 8 hours in an oven. The product after the heating was dispersed in pure water, and subjected to suction filtration with a 0.1-μm PTFE membrane filter. The product after the filtration was washed with pure water, thereby obtaining citric acid-modified cellulose H-type.

The citric acid-modified cellulose H-type was added to 0.1 M sodium hydrate aqueous solution (150 g), stirred at 25° C. for 40 minutes, subjected to suction filtration with a 0.1-μm PTFE membrane filter. The product after the filtration was washed with pure water, thereby obtaining citric acid-modified cellulose Na-type.

The citric acid-modified cellulose Na-type was added with pure water such that the concentration thereof was 1% by mass, and defibration was performed with an ultrasonic homogenizer (UP-400S, Hielscher) at a cycle of 0.5 and an amplitude of 50, thereby obtaining a dispersion including citric acid-modified cellulose.

The properties of the cellulose nanofibers (CNF) are shown in Tables 1 and 2. The amount of TEMPO remaining in cellulose nanofiber E was 1 ppm, and TEMPO was not detected in cellulose nanofibers A to D. The amount of TEMPO was evaluated by ESR (Electron Spin Resonance, for example, e-scan: Bruker Biospin).

TABLE 1

| CNF | Effective chlorine concentration (% by mass) | Amount of carboxy group (mmol/g) | Amount of oxidized cellulose obtained | Fiber diameter (nm) | Fiber length (nm) |
|---|---|---|---|---|---|
| A | 14 | 0.36 | 33 | 3.4 | 330 |
| B | 30 | 0.47 | 6.5 | 5.5 | 190 |
| C | 43 | 1.5 | 0.5 | 4.3 | 130 |
| E | 12 | 1.7 | 33.3 | 1.9 | 810 |

TABLE 2

| CNF | Amount of carboxy group (mmol/g) | Amount of citric acid-modified cellulose obtained (g) | Fiber diameter (nm) | Fiber length (nm) |
|---|---|---|---|---|
| F | 2.4 | 0.9 | 3.0 | 200 |

Example 1

To a dispersion including cellulose nanofiber A (36.9 g), 0.5 M hydrochloric acid (0.52 g) was added and stirred to allow cellulose nanofiber A to precipitate. Subsequently, 0.034 g of monododecylamine (containing 5 g of ethanol, hereinafter the same) and 4.13 g of pure water were added, and the mixture was subjected to stirring, filtration, and filtration while washing with 10 g of pure water were performed in this order, thereby allowing cellulose nanofiber A to react with an amine.

The cellulose nanofiber A reacted with an amine was added with pure water such that the content of cellulose nanofiber A reacted with an amine was 1.5% by mass, and then added with styrene (St) as an ethylene unsaturated monomer and ammonium persulfate (APS) as a polymerization initiator. After subjecting to ultrasonic dispersion, the mixture was heated at 70° C. for 4 hours while stirring in a nitrogen atmosphere to cause polymerization. The mixture was vacuum-dried by heating, thereby obtaining a resin modifier in the form of particles including a cellulose nanofiber and a polymer of an ethylene unsaturated monomer. The formulation of the materials are shown in Table 3.

Example 2

A resin modifier in the form of particles including a cellulose nanofiber and a polymer of an ethylene unsaturated monomer was prepared in the same manner as Example 1, except that the polymerization initiator was changed from ammonium persulfate to 2,2'-azobis(2,4-dimethylvaleronitrile). The formulation of the materials are shown in Table 3.

Example 3

A resin modifier in the form of particles including a cellulose nanofiber and a polymer of an ethylene unsaturated monomer was prepared in the same manner as Example 1, except that cellulose nanofiber A was changed to cellulose nanofiber E. The formulation of the materials are shown in Table 3.

Example 4

A resin modifier in the form of particles including a cellulose nanofiber and a polymer of an ethylene unsaturated monomer was prepared in the same manner as Example 1, except that cellulose nanofiber A was changed to cellulose nanofiber B, and that styrene was changed to isobutyl methacrylate (IBMA). The formulation of the materials are shown in Table 3.

Example 5

A resin modifier in the form of particles including a cellulose nanofiber and a polymer of an ethylene unsaturated monomer was prepared in the same manner as Example 1, except that cellulose nanofiber A was changed to cellulose nanofiber C. The formulation of the materials are shown in Table 3.

Example 6

A resin modifier in the form of particles including a cellulose nanofiber and a polymer of an ethylene unsaturated monomer was prepared in the same manner as Example 1, except that the amine was changed from monododecylamine to tridodecylamine, and that styrene was changed to isobutyl methacrylate (IBMA). The formulation of the materials are shown in Table 3.

Example 7

A resin modifier in the form of particles including a cellulose nanofiber and a polymer of an ethylene unsaturated monomer was prepared in the same manner as Example 1, except that cellulose nanofiber A was changed to cellulose nanofiber B, that the amine was changed from monododecylamine to tetrabutylammonium hydroxide (TBAH), and that styrene was changed to isobutyl methacrylate (IBMA). The formulation of the materials are shown in Table 3.

Example 8

A resin modifier in the form of particles including a cellulose nanofiber and a polymer of an ethylene unsaturated monomer was prepared in the same manner as Example 1, except that cellulose nanofiber A was changed to cellulose nanofiber E, that styrene was changed to isobutyl methacrylate (IBMA), and that dodecylbenzenesulfonic acid sodium salt (DBSS) was used as an emulsifier. The formulation of the materials are shown in Table 3.

Example 9

To a dispersion including cellulose nanofiber B (36.9 g), 0.5 M hydrochloric acid (0.68 g) was added and stirred to allow cellulose nanofiber B to precipitate. Subsequently, 0.014 g of n-propylamine and 4.13 g of pure water were added, and the mixture was subjected to stirring, filtration, and filtration while washing with 10 g of pure water in this order, thereby allowing cellulose nanofiber B to react with an amine. The formulation of the materials are shown in Table 3.

The dispersion was added with pure water such that the content of cellulose nanofiber B reacted with an amine was 1.2% by mass, and then added with styrene (St) as an ethylene unsaturated monomer and ammonium persulfate (APS) as a polymerization initiator. After subjecting to ultrasonic dispersion, the mixture was heated at 70° C. for 4 hours while stirring in a nitrogen atmosphere to cause polymerization. The mixture was vacuum-dried by heating, thereby obtaining a resin modifier in the form of particles including a cellulose nanofiber and a polymer of an ethylene unsaturated monomer. The formulation of the materials are shown in Table 3.

Example 10

A resin modifier in the form of particles including a cellulose nanofiber and a polymer of an ethylene unsaturated monomer was prepared in the same manner as Example 4, except that the amount of IMBA was changed and that dodecylmercaptan (DM) was used as a chain transfer agent during the polymerization. The formulation of the materials are shown in Table 3.

Example 11

A resin modifier in the form of particles including a cellulose nanofiber and a polymer of an ethylene unsaturated monomer was prepared in the same manner as Example 4, except that the amount of IMBA was changed. The formulation of the materials are shown in Table 3.

Example 12

A resin modifier in the form of particles including a cellulose nanofiber and a polymer of an ethylene unsaturated monomer was prepared in the same manner as Example 1, except that the amount of styrene used a monomer was changed. The formulation of the materials are shown in Table 3.

Example 13

In Example 3, the cellulose nanofiber was reacted with an amine after polymerizing the ethylene unsaturated monomer in the presence of the cellulose nanofiber, unlike Examples 1 to 12.

To cellulose nanofiber A, 3.1 g of pure water was added. Subsequently, 0.48 g of styrene (St) as an ethylene unsaturated monomer and 0.13 g of ammonium persulfate (APS) with a concentration of 1% by mass as a polymerization initiator were added. After subjecting to ultrasonic dispersion, the mixture was heated at 70° C. for 4 hours while stirring in a nitrogen atmosphere to cause polymerization.

The dispersion was added with 0.52 g of 0.5 M hydrochloric acid, and stirred. Subsequently, 0.034 g of monododecylamine (containing 5 g of ethanol) were added, and the mixture was subjected to stirring, filtration, and filtration while washing with 10 g of pure water in this order, thereby allowing cellulose nanofiber A to react with an amine.

The mixture was vacuum-dried by heating, thereby obtaining a resin modifier in the form of particles including a cellulose nanofiber and a polymer of an ethylene unsaturated monomer. The formulation of the materials are shown in Table 4.

Example 14

A resin modifier in the form of particles including a cellulose nanofiber and a polymer of an ethylene unsaturated monomer was prepared in the same manner as Example 1, except that cellulose nanofiber A was changed to cellulose nanofiber F. The formulation of the materials are shown in Table 5.

Example 15

A resin modifier in the form of particles including a cellulose nanofiber and a polymer of an ethylene unsaturated monomer was prepared in the same manner as Example 1, except that cellulose nanofiber A was changed to cellulose nanofiber F, and that the amount of styrene used as a monomer was changed. The formulation of the materials are shown in Table 5.

Example 16

A resin modifier in the form of particles including a cellulose nanofiber and a polymer of an ethylene unsaturated monomer was prepared in the same manner as Example 1, except that cellulose nanofiber A was changed to cellulose nanofiber F, and that the amount of styrene used as a monomer was changed. The formulation of the materials are shown in Table 5.

Example 17

A resin modifier in the form of particles including a cellulose nanofiber and a polymer of an ethylene unsaturated monomer was prepared in the same manner as Example 1, except that cellulose nanofiber A was changed to cellulose nanofiber F, and that the amine was changed from monododecylamine to tetrabutylammonium hydroxide (TBAH). The formulation of the materials are shown in Table 5.

Example 18

A resin modifier in the form of particles including a cellulose nanofiber and a polymer of an ethylene unsaturated monomer was prepared in the same manner as Example 1, except that cellulose nanofiber A was changed to cellulose nanofiber F, and that styrene was changed to isobutyl methacrylate (IBMA). The formulation of the materials are shown in Table 5.

Comparative Example 1

A resin modifier in the form of particles including a cellulose nanofiber and a polymer of an ethylene unsaturated monomer was prepared in the same manner as Example 3, except that the cellulose nanofiber was not reacted with an amine. The formulation of the materials are shown in Table 5.

Comparative Example 2

A resin modifier in the form of particles including a cellulose nanofiber and a polymer of an ethylene unsaturated monomer was prepared in the same manner as Example 3, except that the cellulose nanofiber was not reacted with an amine, and that styrene was changed to isobutyl methacrylate (IBMA). The formulation of the materials are shown in Table 5.

Comparative Example 3

A resin modifier in the form of particles including a cellulose nanofiber and a polymer of an ethylene unsaturated monomer was prepared in the same manner as Example 3, except that the cellulose nanofiber was not reacted with an amine, that styrene was changed to isobutyl methacrylate (IBMA), and that dodecylbenzenesulfonic acid sodium salt (DBSS) was used as an emulsifier. The formulation of the materials are shown in Table 5.

Comparative Example 4

To a dispersion including cellulose nanofiber B (36.9 g), 0.5 M hydrochloric acid (0.68 g) was added and stirred to allow cellulose nanofiber B to precipitate. Subsequently, 0.044 g of monododecylamine and 4.13 g of pure water were added, and the mixture was subjected to stirring, filtration, and filtration while washing with 10 g of pure water in this order, thereby allowing cellulose nanofiber B to react with an amine. The product after the reaction was used as a resin modifier without performing polymerization of the ethylene unsaturated monomer. The formulation of the materials are shown in Table 5.

Comparative Example 5

Cellulose nanofiber B was used as a resin modifier.

TABLE 3

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Cellulose nanofiber dispersion (1.3% by mass) | | Table 1A 36.9 | Table 1A 36.9 | Table 1E 36.9 | Table 1B 36.9 | Table 1C 36.9 | Table 1A 36.9 | Table 1B 36.9 | Table 1E 36.9 | Table 1B 36.9 | Table 1B 36.9 | Table 1B 36.9 | Table 1A 36.9 |
| 0.5M hydrochloric acid | | 0.52 | 0.52 | 2.45 | 0.68 | 2.16 | 0.52 | 0.68 | 2.45 | 0.68 | 0.68 | 0.68 | 0.052 |
| Amine/ quaternary ammonium salt compound | Monododexylamine | 0.034 | 0.034 | 0.16 | 0.044 | 0.141 | — | — | 0.16 | — | 0.044 | 0.044 | 0.034 |
| | Tridodecylamine | — | — | — | — | — | 0.096 | — | — | — | — | — | — |
| | TBAH | — | — | — | — | — | — | 0.125 | — | — | — | — | — |
| | n-propylamine | — | — | — | — | — | — | — | — | 0.014 | — | — | — |
| | Total | 40 | 40 | 40 | 40 | 40 | 40 | 40 | 40 | 40 | 40 | 40 | 40 |
| Monomer | Styrene | 0.48 | 0.48 | 0.48 | — | 0.48 | — | — | — | 0.48 | — | — | 4.8 |
| | IBMA | — | — | — | 0.12 | — | 0.48 | 0.05 | 0.24 | — | 0.48 | 0.48 | — |
| Initiator | APS (1% by mass) | 0.13 | — | 0.13 | 0.02 | 0.13 | 0.10 | 0.01 | 0.05 | 0.13 | 0.19 | 0.04 | 0.52 |
| | 2,2'-azobis(2,4-dimethyl-valeronirile) | — | 0.001 | — | — | — | — | — | — | — | — | — | — |

TABLE 3-continued

|  | Examples | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Emulsifier (DBSS) | — | — | — | — | — | — | — | 0.48 | — | — | — | — |
| Chain transfer agent (DM) | — | — | — | — | — | — | — | — | — | 0.03 | — | — |
| Total | 40.6 | 40.5 | 40.6 | 40.1 | 40.6 | 40.6 | 40.1 | 40.8 | 40.6 | 40.7 | 40.5 | 45.3 |

TABLE 4

|  |  | Example 14 |
| --- | --- | --- |
| Cellulose nanofiber dispersion (1.3% by mass) |  | Table 1A 36.9 |
| Water |  | 3.1 |
| Monomer | Styrene | 0.48 |
|  | IBMA | — |
| Initiator | APS (1% by mass) | 0.13 |
|  | 2,2'-azobis(2,4-dimethylvaleronirile) | — |
| Emulsifier (DBSS) |  | — |
| Chain transfer agent (DM) |  | — |
| Total |  | 40.61 |
| 0.5M hydrochloric acid |  | 0.52 |
| Amine/quaternary ammonium salt compound | Monododexylamine | 0.034 |
|  | Tridodecylamine | — |
|  | TBAH | — |
|  | n-propylamine | — |
| Total |  | 41.2 | dispersed in ion exchange water to have an appropriate concentration, and a particle size distribution thereof is obtained. The median diameter of the particle size distribution is regarded as the particle size of the resin modifier. The refraction index for the measurement is 1.5 for each sample. The results are shown in Table 6.

<Measurement of Weight Average Molecular Weight (Mw)>

The weight average molecular weight of a polymer of an ethylene unsaturated monomer is measured by GPC (gel permeation chromatography, for example, HLC-8220, Tosoh Corporation). Specifically, a resin modifier including a cellulose nanofiber and a polymer of an ethylene unsaturated monomer is added with a solvent to dissolve the polymer. Then, the polymer is filtrated with a 0.45-μm filter, and the weight average molecular weight of the filtrated solution is measured by polystyrene conversion. The results are shown in Table 6.

TABLE 5

|  |  | Examples | | | | | Comparative Examples | | | |
| --- | --- | --- | --- | --- | --- | --- | --- | --- | --- | --- |
|  |  | 14 | 15 | 16 | 17 | 18 | 1 | 2 | 3 | 4 |
| Cellulose nanofiber dispersion (1.3% by mass) |  | Table 2F 36.9 | Table 2F 36.9 | Table 2F 36.9 | Table 2F 36.9 | Table 2F 36.9 | Table 1E 36.9 | Table 1E 36.9 | Table 1E 36.9 | Table 1B 36.9 |
| 0.5M hydrochloric acid |  | 4.33 | 4.33 | 4.33 | 4.33 | 4.33 | 2.45 | 2.45 | 2.45 | 0.68 |
| Amine/quaternary ammonium salt compound | Monododexylamine | 0.283 | 0.283 | 0.283 | — | 0.283 | — | — | — | 0.044 |
|  | Tridodecylamine | — | — | — | 0.396 | — | — | — | — | — |
|  | TBAH | — | — | — | — | — | — | — | — | — |
|  | n-propylamine | — | — | — | — | — | — | — | — | — |
| Total |  | 40 | 40 | 40 | 40 | 40 | 40 | 40 | 40 | 40 |
| Monomer | Styrene | 0.48 | 0.05 | 4.8 | 0.48 | — | 0.48 | — | 0.48 | 0.48 |
|  | IBMA | — | — | — | — | 0.48 | — | 0.48 | — | — |
| Initiator | APS (1% by mass) | 0.13 | 0.13 | 0.13 | 0.13 | 0.13 | 0.13 | 0.1 | 0.1 | — |
|  | 2,2'-azobis(2,4-dimethylvaleronirile) | — | — | — | — | — | — | — | — | — |
| Emulsifier (DBSS) |  | — | — | — | — | — | — | — | 0.48 | — |
| Chain transfer agent (DM) |  | — | — | — | — | — | — | — | — | — |
| Total |  | 40.6 | 40.2 | 44.9 | 40.6 | 40.6 | 40.6 | 40.6 | 41.1 | 40.0 |

<Microscope Observation>

The resin modifiers obtained in the Examples were observed with an electron microscope. As a result, the resin modifier were in a state of particles in which at least a part of the cellulose nanofiber was included in the polymer of the ethylene unsaturated monomer.

<Measurement of Particle Size>

The particle size of the resin modifier are measured with a laser diffraction particle size distribution analyzer (for example, MICROTRAC MT 3000 II, Microtrac BEL). Specifically, the resin modifier including a cellulose nanofiber and a polymer of an ethylene unsaturated monomer was <Evaluation>

The resin modifier obtained in the Examples and the Comparative Examples was added to ABS resin (Techno-UMG Co., Ltd., ABS130) as a formable resin, such that the resin modifier was 1% by mass of the total amount. Specifically, the resin modifier and pellets of ABS resin were mixed in a cup, and kneaded while heating with a plastomill. The kneading was performed at 160° C. for 9 minutes. After the kneading, the mixture was pressed with a pressing machine at 180° C. for 2 minutes, thereby obtaining a plate-shaped product. The pressure was applied at 10 MPa for the first 1 minute and 15 MPa for the subsequent 1 minute. A sample having a number-3 dumbbell shape according to JIS K 6251:2010 (thickness: 1 mm) was prepared from the plate-shaped product. Similarly, a sample was prepared from ABS resin not including a resin modifier.

(Evaluation of Dispersibility)

The sample was visually observed and evaluated by the following criteria. The results are shown in Table 6.

◯: spots, surface irregularities, streaks or the like due to defective dispersion of a resin modifier is not observed.

x: spots, surface irregularities, streaks or the like due to defective dispersion of a resin modifier is clearly observed.

(Evaluation of Breaking Stress)

The sample was subjected to a tensile stress test according to JIS K 6251:2010 (rate of tension: 5 mm/min), and the breaking stress (MPa) and the breaking elongation (mm) of the sample were measured.

The breaking stress was converted to an index relative to the measured value of a sample of ABS resin not including a resin modifier as 1, and evaluated by the following criteria. The results are shown in Table 6.

◯: the index is 1.05 or more.

Δ: the index is more than 1 but less than 1.05.

x: the index is not more than 1.

The breaking elongation was converted to an index relative to the measured value of a sample of ABS resin not including a resin modifier as 1, and evaluated by the following criteria. The results are shown in Table 6.

◯: the index is 0.8 or more.

Δ: the index is more than 0.6 but less than 0.8.

x: the index is not more than 0.6.

TABLE 6

| | | CNF | Amine/quaternary ammonium salt Kind | Carbon number | Timing of reaction | Monomer | Mass ratio CNF | Monomer | Method of polymeization |
|---|---|---|---|---|---|---|---|---|---|
| Examples | 1 | A | Monododecylamine | 12 | BP | St | 100 | 100 | EP |
| | 2 | A | Monododecylamine | 12 | BP | St | 100 | 100 | SP |
| | 3 | E | Monododecylamine | 12 | BP | St | 100 | 100 | EP |
| | 4 | B | Monododecylamine | 12 | BP | IBMA | 100 | 25 | EP |
| | 5 | C | Monododecylamine | 12 | BP | St | 100 | 100 | EP |
| | 6 | A | Monododecylamine | 36 | BP | IBMA | 100 | 100 | EP |
| | 7 | B | TBAH | 16 | BP | IBMA | 100 | 10 | EP |
| | 8 | E | Monododecylamine | 12 | BP | IBMA | 100 | 50 | EP |
| | 9 | B | n-propylamine | 3 | BP | St | 100 | 100 | EP |
| | 10 | B | Monododecylamine | 12 | BP | IBMA | 100 | 100 | EP |
| | 11 | B | Monododecylamine | 12 | BP | IBMA | 100 | 100 | EP |
| | 12 | A | Monododecylamine | 12 | BP | St | 100 | 1000 | EP |
| | 13 | A | Monododecylamine | 12 | AP | St | 100 | 100 | EP |
| | 14 | F | Monododecylamine | 12 | BP | St | 100 | 100 | EP |
| | 15 | F | Monododecylamine | 12 | BP | St | 100 | 10 | EP |
| | 16 | F | Monododecylamine | 12 | BP | St | 100 | 1000 | EP |
| | 17 | F | TBAH | 16 | BP | St | 100 | 100 | EP |
| | 18 | F | Monododecylamine | 12 | BP | IBMA | 100 | 100 | EP |
| Comparative Examples | 1 | E | — | — | — | St | 100 | 100 | EP |
| | 2 | E | — | — | — | IBMA | 100 | 100 | EP |
| | 3 | E | — | — | — | IBMA | 100 | 100 | EP |
| | 4 | B | Monododecylamine | 12 | BP | — | 100 | 0 | — |
| | 5 | B | — | — | — | — | 100 | 0 | — |

| | | Particle size (μm) | Mw (×10$^4$) | Evaluation Foaming | Dispersibility | Breaking stress | Breaking elongation |
|---|---|---|---|---|---|---|---|
| Examples | 1 | 0.05 | 114 | ◯ | ◯ | ◯ | ◯ |
| | 2 | 30 | 12 | ◯ | ◯ | ◯ | ◯ |
| | 3 | 0.05 | 116 | ◯ | ◯ | ◯ | ◯ |
| | 4 | 0.04 | 120 | ◯ | ◯ | ◯ | ◯ |
| | 5 | 0.05 | 114 | ◯ | ◯ | ◯ | ◯ |
| | 6 | 0.05 | 110 | ◯ | ◯ | ◯ | ◯ |
| | 7 | 0.05 | 107 | ◯ | ◯ | ◯ | Δ |
| | 8 | 0.03 | 155 | x | ◯ | ◯ | ◯ |
| | 9 | 0.05 | 111 | ◯ | ◯ | ◯ | Δ |
| | 10 | 0.05 | 0.6 | ◯ | ◯ | Δ | Δ |
| | 11 | 0.05 | 291 | ◯ | ◯ | ◯ | ◯ |
| | 12 | 0.05 | 135 | ◯ | ◯ | ◯ | ◯ |
| | 13 | 0.05 | 122 | ◯ | ◯ | ◯ | ◯ |
| | 14 | 0.04 | 121 | ◯ | ◯ | ◯ | ◯ |
| | 15 | 0.05 | 101 | ◯ | ◯ | ◯ | ◯ |
| | 16 | 0.06 | 105 | ◯ | ◯ | ◯ | ◯ |
| | 17 | 0.06 | 110 | ◯ | ◯ | ◯ | Δ |
| | 18 | 0.05 | 131 | ◯ | ◯ | ◯ | ◯ |

TABLE 6-continued

| | | | | | | | |
|---|---|---|---|---|---|---|---|
| Comparative Examples | 1 | 0.05 | 112 | ○ | ○ | ○ | x |
| | 2 | | | Not evaluated | | | |
| | 3 | 0.03 | 150 | x | ○ | ○ | x |
| | 4 | — | — | ○ | x | x | x |
| | 5 | — | — | ○ | x | x | x |

In Table 6, "BP" and "AP" refer to "before the polymerization" and "after the polymerization", respectively. "EP" and "SP" refer to "emulsion polymerization" and "suspension polymerization", respectively.

As shown in Table 6, the ABS resins that were added with the resin modifier of the Examples, obtained by polymerizing an ethylene unsaturated monomer in the presence of a cellulose nanofiber that was reacted with an amine or a quaternary ammonium salt compound, exhibited favorable results in both breaking stress and breaking elongation.

Further, among the composite materials obtained by mixing the resin modifier with a formable resin, it was visually confirmed that the coloring of the Examples in which the cellulose nanofiber was reacted with a quaternary ammonium salt compound was less than that of the other Examples.

The ABS resins added with the resin modifier of Comparative Example 1 or Comparative Example 3, in which the cellulose nanofiber was not reacted with an amine or a quaternary ammonium salt compound, exhibited inferior breaking elongation.

The ABS resins added with the resin modifier of Comparative Example 4 or Comparative Example 5, in which the ethylene unsaturated monomer was not polymerized in the presence of cellulose nanofiber, exhibited inferior dispersibility to the ABS resin and inferior breaking stress and breaking elongation.

Comparative Example 2, in which IBMA was used as an ethylene unsaturated monomer and an emulsifier was not used, failed to evaluate the properties of the ABS resin because a resin modifier could not be obtained due to aggregation of the IBMA.

In Comparative Example 3, in which an emulsifier was used in order to disperse the IBMA, polymerization reaction could proceed but foaming in particles occurred during drying.

In Example 4, in which the cellulose nanofiber was reacted with an amine or a quaternary ammonium salt compound, aggregation of the IBMA was suppressed without using an emulsifier and the resin modifier was obtained, owing to the cellulose fiber functioning as a dispersant.

The invention claimed is:

1. A method of producing a resin modifier, the method comprising a process of polymerizing an ethylene unsaturated monomer to form a polymer in the presence of a cellulose nanofiber, the cellulose nanofiber being reacted with an amine or a quaternary ammonium salt compound, wherein the polymer of the ethylene unsaturated monomer has a weight-average molecular weight of from 5,000 to 3,000,000.

2. The method of producing a resin modifier according to claim 1, wherein the resin modifier is in a particulate state.

3. The method of producing a resin modifier according to claim 1, wherein the process of polymerizing is emulsion polymerization or suspension polymerization.

4. The method of producing a resin modifier according to claim 1, wherein the process of polymerizing is performed without using an emulsifier.

5. The method of producing a resin modifier according to claim 1, wherein a proportion of an ethylene unsaturated monomer having a functional group in the ethylene unsaturated monomer is 5 mol % or less.

6. The method of producing a resin modifier according to claim 1, wherein a product obtained by defibrating a polyvalent carboxylic acid-modified cellulose is used as the cellulose nanofiber, the polyvalent carboxylic acid-modified cellulose being obtained by allowing a cellulose-based raw material to react with a polyvalent carboxylic acid.

7. The method of producing a resin modifier according to claim 6, wherein the polyvalent carboxylic acid comprises at least one selected from the group consisting of a dicarboxylic acid, a tricarboxylic acid, a tetracarboxylic acid and a hexacarboxylic acid.

8. The method of producing a resin modifier according to claim 6, wherein the polyvalent carboxylic acid comprises citric acid.

9. The method of producing a resin modifier according to claim 1, wherein the oxidized cellulose is obtained without using a compound having a piperidine structure.

10. A resin modifier, comprising a cellulose nanofiber that is reacted with an amine or a quaternary ammonium salt compound, and a polymer of an ethylene unsaturated monomer, wherein the polymer of the ethylene unsaturated monomer has a weight-average molecular weight of from 5,000 to 3,000,000.

11. The resin modifier according to claim 10, wherein the cellulose nanofiber is a product obtained by defibrating a polyvalent carboxylic acid-modified cellulose, the polyvalent carboxylic acid-modified cellulose being obtained by allowing a cellulose-based raw material to react with a polyvalent carboxylic acid.

12. The resin modifier according to claim 10, being in a particulate state.

13. The resin modifier according to claim 10, wherein a proportion of a structural unit having a functional group among structural units of the polymer of an ethylene unsaturated monomer is 5 mol % or less.

14. The resin modifier according to claim 10, wherein an amount of the ethylene unsaturated monomer with respect to 100 parts by mass of the cellulose nanofiber is from 5 parts by mass to 1,000 parts by mass.

15. A composite material, comprising the resin modifier according to claim 10 and a resin.

16. The composite material according to claim 15, wherein the resin includes a component that is identical to a component included in the resin modifier, or the resin includes a segment or a functional group having an affinity with the resin modifier.

* * * * *